US006394931B1

(12) United States Patent
Genise

(10) Patent No.: US 6,394,931 B1
(45) Date of Patent: May 28, 2002

(54) STARTING AND DRIVELINE SHOCK PROTECTION CONTROL METHOD AND SYSTEM

(75) Inventor: Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/717,986

(22) Filed: Nov. 21, 2000

Related U.S. Application Data

(63) Continuation-in-part of application No. 09/356,757, filed on Jul. 19, 1999, now Pat. No. 6,126,569.

(51) Int. Cl.$^7$ .......................... F16H 59/60; F16H 57/62
(52) U.S. Cl. .......................... 477/97; 477/107; 477/900
(58) Field of Search .......................... 477/97, 107, 900

(56) References Cited

U.S. PATENT DOCUMENTS

| | | | | |
|---|---|---|---|---|
| 4,854,194 A | * | 8/1989 | Kaneko et al. ................ 74/866 |
| 5,406,862 A | * | 4/1995 | Amsallen .................. 74/336 R |
| 5,509,867 A | | 4/1996 | Genise ........................ 477/120 |
| 5,510,982 A | * | 4/1996 | Ohnishi et al. .......... 364/424.1 |
| 5,655,407 A | | 8/1997 | Dresden, III et al. ......... 74/336 |
| 5,679,096 A | | 10/1997 | Stine et al. .................. 477/111 |
| 5,797,110 A | | 8/1998 | Braun et al. .................... 701/84 |
| 6,205,389 B1 | * | 3/2001 | Genise ........................ 701/51 |

* cited by examiner

Primary Examiner—Dirk Wright
(74) Attorney, Agent, or Firm—Rader, Fishman & Grauer PLLC

(57) ABSTRACT

A method and system of controlling a maximum start gear ratio of an automated mechanical transmission system is disclosed. To protect the clutch under conditions of level ground up to a mild grade, a maximum starting gear is determined by the system when a valid Gross Combination Weight (GCW) of the vehicle is known. The maximum starting gear is defined as the highest starting gear ratio that will provide adequate startability without having to put excessive energy into the clutch during the start. The system will force a downshift if insufficient vehicle acceleration is detected by the system. If the GCW of the vehicle is not known, the maximum start gear will be limited to that for a fully laden vehicle. To protect against too much power being transmitted through the clutch, the power through the clutch is determined and the engine torque and/or engine speed is limited to values resulting in power through the clutch below a preset value. The power through the clutch is determined by the transmission input speed, the engine speed and the torque at the flywheel.

12 Claims, 3 Drawing Sheets

STARTING AND DRIVELINE SHOCK PROTECTION CONTROL METHOD AND SYSTEM

CROSS-NOTING TO RELATED APPLICATION

This application is a Continuation-In-Part of U.S. patent application Ser. No. 09/356,757, filed on Jul. 19, 1999 now U.S. Pat. No. 6,126,569, the entire contents of which are hereby incorporated by reference.

FIELD OF THE INVENTION

The present invention relates to a control method/system for controlling vehicle starting (i.e., vehicle launch) in an at least partially automated mechanical transmission system. In particular, the present invention relates to the control of starting in a vehicular automated mechanical transmission system wherein the system senses conditions indicative of a vehicle launch, such as very low vehicle ground speed and a less-than-fully engaged master clutch, and limits maximum engine speed until substantially full clutch engagement is sensed.

BACKGROUND OF THE INVENTION

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639.

Controls for automated mechanical transmission systems, especially wherein dynamic shifting is accomplished while maintaining the master clutch engaged and/or wherein the master clutch is manually controlled and is disengaged only for starting or stopping the vehicle, are known in the prior art, as may be seen by reference to U.S. Pat. Nos. 4,576,065; 4,916,979; 5,335,566; 5,425,689; 5,272,939; 5,479,345; 5,533,946; 5,582,069; 5,582,558; 5,620,392; 5,489,247; 5,490,063 and 5,509,867, the disclosures of which are incorporated herein by reference.

The prior art systems, especially the prior art systems having manually controlled clutch pedals used for starting, provided the opportunity for abuse of the driveline if the driver, when starting, fully depressed the throttle and then quickly released the clutch. Such "popping" of the clutch could cause undue wear and/or damage to the various components of the vehicle driveline.

SUMMARY OF THE INVENTION

This invention relates to a control for a vehicular automated mechanical transmission system which will sense conditions indicative of vehicle launch and will protect the vehicle from shocks until the master clutch is fully or substantially fully engaged. The foregoing is accomplished in a system wherein operating conditions are sensed/determined and engine speed (ES) controlled by sensing vehicle start conditions (i.e., if the vehicle ground speed is low (OS<REF), the transmission is engaged in a gear ratio, the throttle is depressed (THL>REF), and if the master clutch is not fully engaged, then engine speed is governed to a maximum speed equal to about 200–300 RPM above idle (ES<$ES_{IDLE}$+300 RPM)).

The above control logic will minimize large driveline shocks caused by rapidly engaging ("popping") the master clutch at high engine speeds and also provides a handy engine speed governor for starting on grades. For example, when starting the vehicle on a grade, or in other highly loaded situations, the driver could fully depress the accelerator and then slowly let out the clutch. When the clutch becomes fully locked up, the engine speed control is ended and the vehicle accelerates normally. This allows the driver to use a higher engine speed to get started in a difficult condition while retaining the benefits of the electronic speed limit control. In a hill-start condition, the driver could also use the trailer brakes, or another hill-start aid, to hold the vehicle from rolling backward during the start.

Accordingly, an improved start control for automated mechanical transmissions is provided that will minimize driveline shocks due to clutch "popping" and will provide good start-on-grade performance.

In another aspect of the invention, a system and method of controlling a vehicular automated transmission system is disclosed. The method comprises the steps of:

(a) determining a maximum starting gear of the system when a Gross Combination Weight (GCW) of the vehicle is known by the system; and (b) limiting the maximum starting gear of the system to a fully laden vehicle when the GCW of the vehicle is not known by the system.

In addition, the method includes the steps of determining an allowed start gear ratio when insufficient vehicle acceleration is being detected by the system and forcing a downshift of the transmission until the system detects sufficient vehicle acceleration. Further, the method includes the steps of determining the power transmitted through the clutch by using the transmission input speed, the engine speed and the torque at a flywheel, and limiting one of engine torque and engine speed when excessive power through the clutch is detected by the system.

The system of the invention includes a microprocessor to process input signals in accordance with logic rules to issue command output signals to transmission system actuators. Specifically, the microprocessor receives a first input corresponding to a predetermined weight of the vehicle, a second input corresponding to a starting gear ratio of the system when the predetermined weight of the vehicle is known by the system, and generates an output signal limiting the maximum starting gear ratio of the system to a fully laden vehicle when the predetermined weight of the vehicle is not known by the system. In addition, an allowed start gear ratio of the system is determined when insufficient vehicle acceleration is being detected by the system and a downshift of the transmission is forced until the system detects sufficient vehicle acceleration. The system also determines the power transmitted through the clutch and limits the engine torque and/or engine speed to a preset value when excessive power through the clutch is detected by the system.

Various aspects and advantages of this invention will become apparent to those skilled in the art from the following detailed description of the preferred embodiment, when read in light of the accompanying drawings.

DETAILED DESCRIPTION OF PREFERRED EMBODIMENTS

Figure 1:
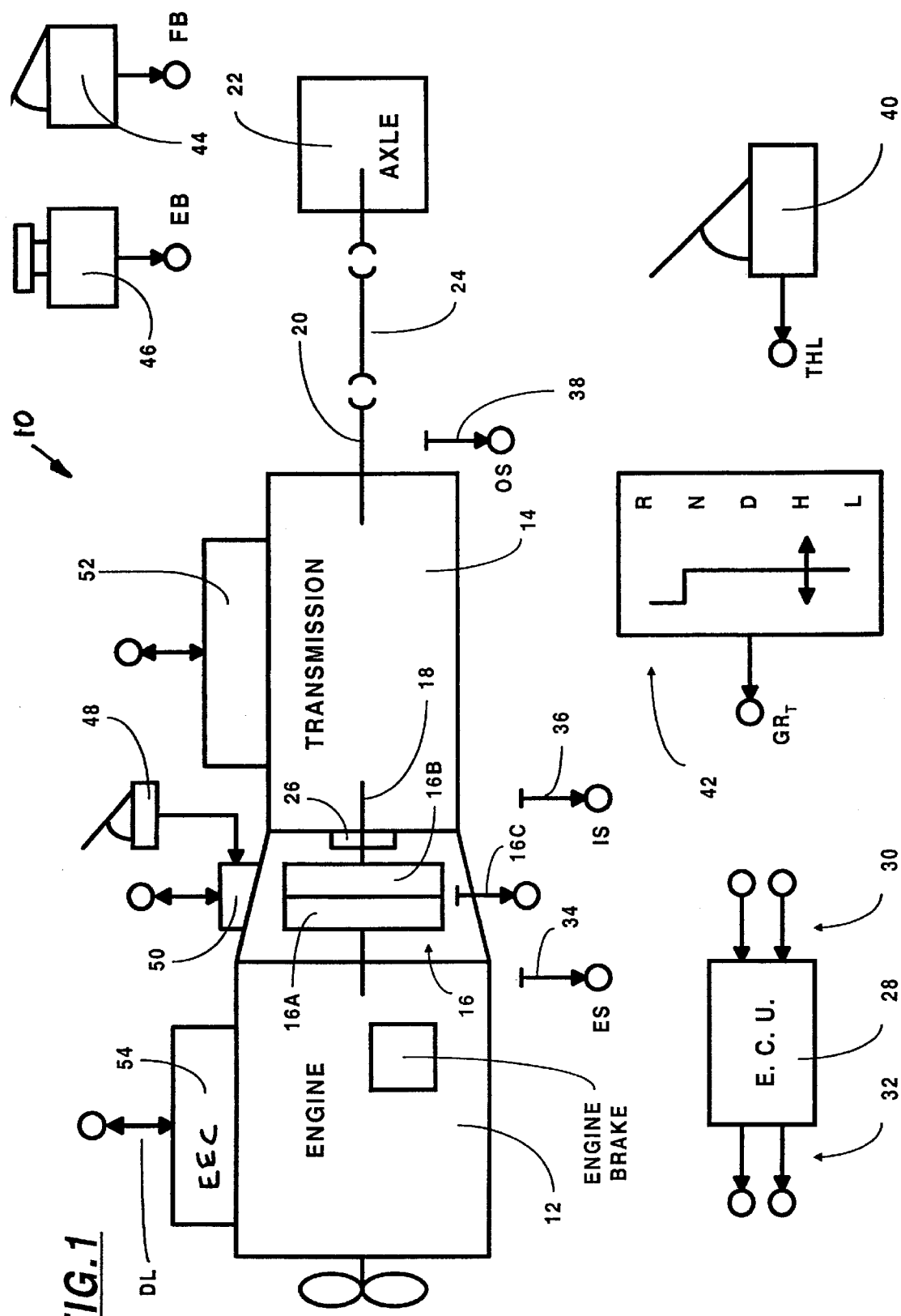
FIG. 1 is a schematic illustration, in block diagram format, of an automated mechanical transmission system utilizing the control of the invention.

Referring now to the drawings, there is schematically illustrated in FIG. 1 an at least partially automated mechanical transmission system 10 intended for vehicular use. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter-and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541; 5,450,934 and 5,908,100, herein incorporated by reference. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445, herein incorporated by reference.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986, herein incorporated by reference.

System 10 includes a rotational speed sensor 34 for sensing rotational speed of the engine and providing an output signal (ES) indicative thereof, a rotational speed sensor 36 for sensing the rotational speed of the input shaft 18 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof.

As is known, if the clutch is engaged, the rotational speed of the engine may be determined from the speed of the input shaft and/or the speed of the output shaft and the engaged transmission ratio ($ES = IS = OS*GR_T$).

System 10 also may include sensors 44 and 46 for sensing operation of the vehicle foot brake (also called service brake) and engine brakes, respectively, and for providing signals FB and EB, respectively, indicative thereof.

The master clutch 16 may be controlled by a clutch pedal 48 or by a clutch actuator 50 responding to output signals from the ECU 28.

Alternatively, an actuator responsive to control output signals may be provided, which may be overridden by operation of the manual clutch pedal. In the preferred embodiment, the clutch is manually controlled and used only to launch and stop the vehicle (see U.S. Pat. Nos. 4,850,236; 5,272,939 and 5,425,689, herein incorporated by reference). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391, herein incorporated by reference. Actuator 52 may shift the main and/or auxiliary section of transmission 14. The engaged and disengaged (i.e., "not engaged") condition of clutch 16 may be sensed by a position sensor 16C or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE J1939 and/or ISO 11898. The ECU 28 may be incorporated within the engine controller 54.

As is known, for automated shifting embodiments, the ECU 28 must determine when upshifts and downshifts are required and if a single or skip shift is desirable (see U.S. Pat. Nos. 4,361,060; 4,576,065; 4,916,979 and 4,947,331, herein incorporated by reference).

Manual truck transmissions with manual starting clutches provide the opportunity for abuse of the driveline by the driver. For example, the driver has the ability (when starting the vehicle from rest) to depress the accelerator and quickly release the clutch, putting excessive power through the clutch and/or imposing an excessive torque spike in the driveline. This can be very damaging to the various components of the driveline. Therefore, driveline component manufacturers have to design their components to withstand this abuse, creating overdesigned, expensive components.

Automated mechanical transmissions with a manual clutch can prevent much of this abuse with the control system of the present invention, which does not allow maximum engine speeds when engaging the clutch during starts.

When the vehicle is in start-from-rest condition (i.e., vehicle speed slow, in gear, clutch disengaged, throttle depressed, etc.), engine speed is limited (via J1939 commands or similar data bus) to a small margin (200–300 RPM) above idle speed. For a typical diesel engine governed to a maximum speed of about 2100 RPM, idle speed is about 600RPM. Governing accomplishes two benefits: (1) it prevents large driveline shocks caused from rapidly engaging ("popping") the clutch at high engine speeds; and (2) it provides a second, handy engine speed governor for starting on grades. For example, when starting the vehicle on a grade, or other highly loaded situations, the driver could fully depress the accelerator and then slowly let out the clutch. When the clutch becomes fully locked up, the engine speed control is ended and the vehicle accelerates normally. Ending the engine speed control allows the driver to use a higher engine speed to get started under difficult environmental conditions while retaining the benefits of the electronic speed limit control. In a hill-start condition, the driver could also use the trailer brakes, or another hill-start aid, to hold the vehicle from rolling backward during the start.

By way of example, if the vehicle is stopped or traveling very slowly (less than 3–5 MPH), the throttle pedal is displaced (THL>20–50% of full displacement), the transmission is engaged in a ratio and the clutch is not fully engaged, then the engine fuel control will be commanded to fuel the engine so that engine speed does not exceed idle speed ($ES_{IDLE}$) plus a predetermined RPM (about 300 RPM), i.e., ES<$ES_{IDLE}$+300 RPM. Preferably, the engine will be controlled over an electronic data link conforming to SAE J1939 or a similar protocol.

Figure 2:
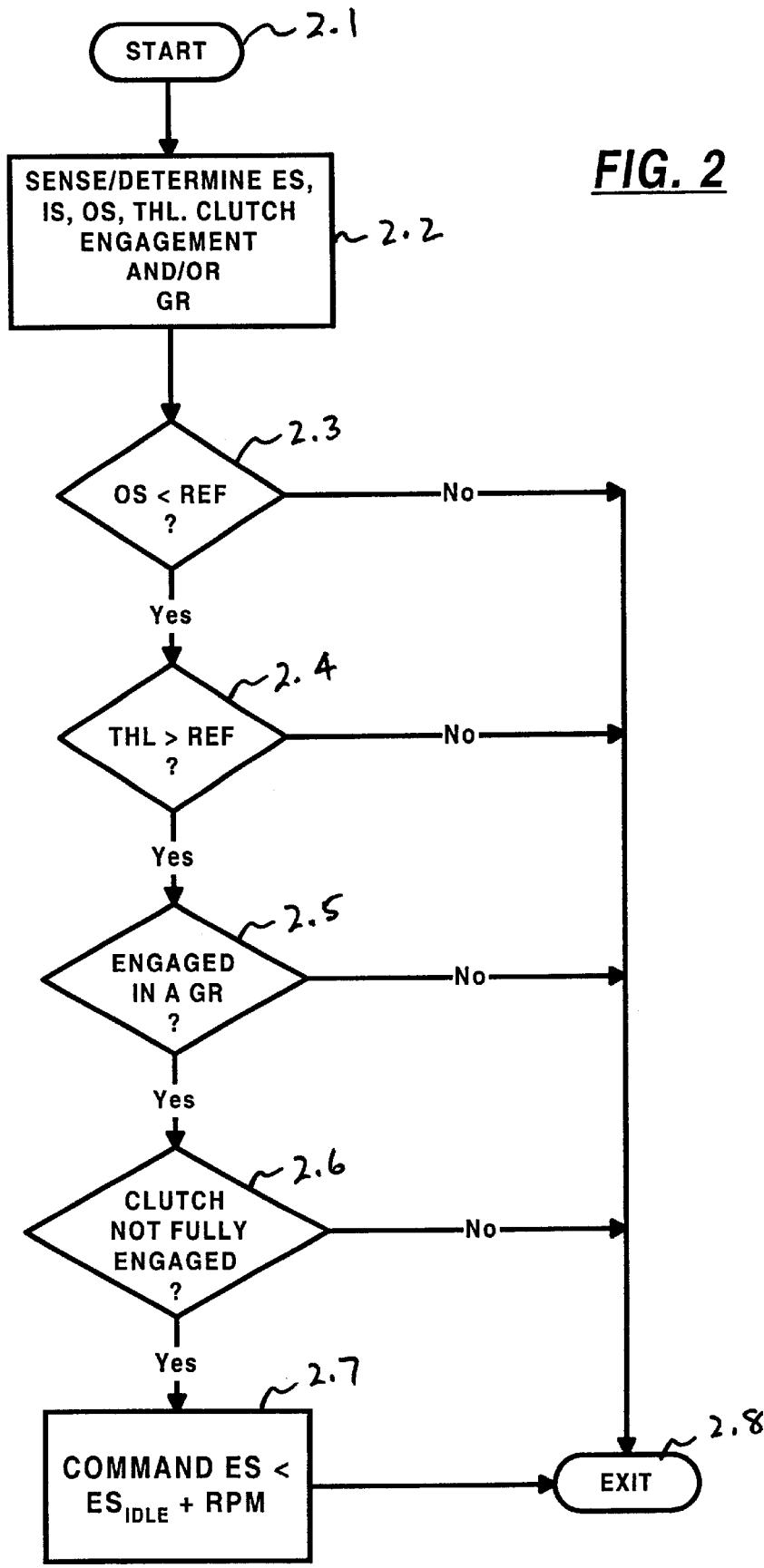
FIG. 2 is a schematic illustration, in flow chart format, of the control of the invention.

The control of the present invention is shown in flow chart format in FIG. 2. The process begins at Step 2.1. Next, the controller 28 receives input signals including one or more of signals indicative of engine speed, transmission input speed, transmission output speed, operator throttle setting, clutch engagement and/or gear ratio, and processes the input signals in accordance with logic rules to issue command output signals to the transmission system actuators in Step 2.2. Then, the system 10 determines if the output signal (OS) indicative of the rotational speed of the input shaft 16 is less than a reference value in Step 2.3. If not, then the control exits in Step 2.8.

If the rotational speed of the input shaft 16 is less than the reference value, then the system 10 determines if the output signal (THL) indicative of the displacement of the throttle pedal is greater than a reference value in Step 2.4. If not, then the control exits in Step 2.8.

If the displacement of the throttle pedal is greater than the reference value, then the system 10 determines if the operator selected an operating mode of the transmission system (is engaged in a gear ratio) in Step 2.5. If not, then the control exits in Step 2.8.

If the operator is engaged in a gear ratio, then the system 10 determines if the operator has not fully engaged the clutch. If not, then the control exits in Step 2.8.

If the clutch is not fully engaged, then the system 10 will command the engine fuel control to fuel the engine so that engine speed does not exceed idle speed ($ES_{IDLE}$) plus a predetermined RPM (about 300 RPM), i.e., ES<$ES_{IDLE}$+300 RPM. Then, the control exits in Step 2.8.

As described above, the control logic of the present invention will prevent or minimize driveline shock caused by clutch "popping," allowing less expensive driveline components to be utilized. The control logic of the present invention also enhances vehicle launch while on a grade. Accordingly, it may be seen that an improved control system/method for controlling starting in an at least partially automated mechanical transmission system is provided.

Automated mechanical transmissions with a manual clutch are also effective for making consistently smooth shifts and minimizing abuse to the gearbox due to shifting. In addition, automated mechanical transmissions also reduce the wear to the manually-operated master starting clutch due to the reduced number of clutch engagements and disengagements. However, as the master clutch is still driver operated and the automated mechanical transmission can be started from rest in a number of different gear ratios, there is still a large potential for clutch abuse due to starting in the wrong gear under prevailing Gross Combination Weight (GCW) and road conditions (i.e., grade, rolling resistance, and the like).

Figure 3:
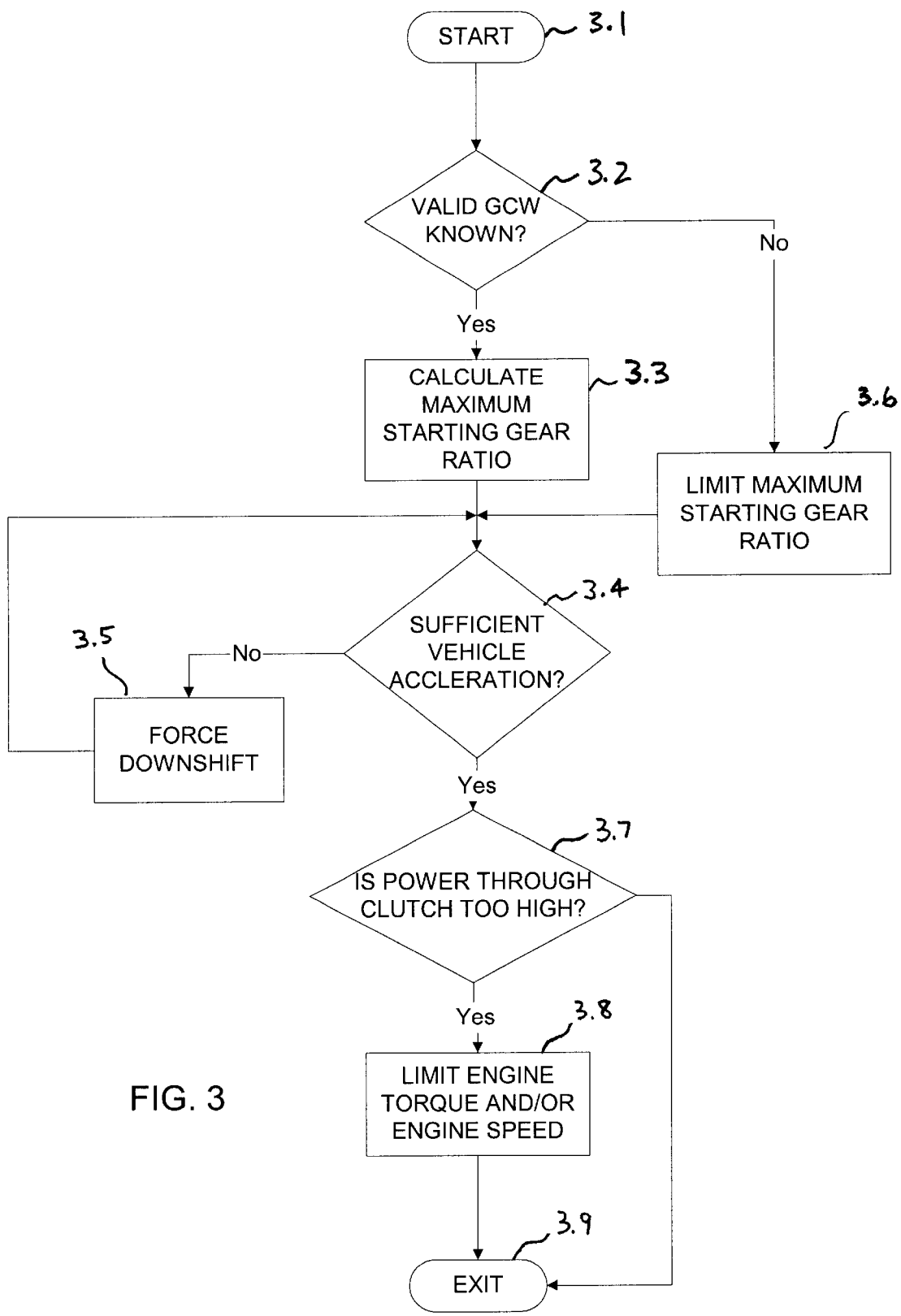
FIG. 3 is a schematic illustration, in flow chart format, of another aspect of the control of the invention.

As described above, the control system of the present invention protects the clutch from excessive wear and abuse by forcing the correct starting gear when the vehicle is started from rest. As shown in FIG. 3, another aspect of the control system uses a series of rules to protect the master clutch during start-from-stop condition. First, the control system begins in Step 3.1. Next, the system 10 determines if the automated mechanical transmission knows the GCW of the vehicle in Step 3.2. If a valid GCW is known by the system 10, then the system 10 proceeds to calculate the maximum starting gear to protect the clutch under normal road load conditions, such as level ground, up to road load conditions with increased resistance, such as mud, snow, sand, mild grade (up to 2 to 3 percent), and the like in Step 3.3.

By way of example, if the vehicle GCW is approximately 80,000 lbs., the system 10 will determine the highest starting ratio that will provide adequate startability without having to put excessive energy into the clutch 16 during the start from the start-from-rest condition. This calculation can be performed from a table, such as a look-up table, of standard startability/gradability values for that particular vehicle.

Once the driver tries to start the vehicle from rest in the chosen allowed starting gear, if the system 10 detects that sufficient vehicle acceleration is not being created from the calculated torque at the flywheel because the vehicle may be on a grade or heavy rolling resistance in Step 3.4. Then, the system 10 will force a downshift making that new lower gear the maximum starting gear temporarily until the driver gets the vehicle rolling faster than a threshold speed in Step 3.5. A sufficient amount of acceleration is defined as the acceleration needed to get the vehicle moving from rest. The sufficient or acceptable amount of acceleration may be inversely proportional to the vehicle GCW, i.e., the sufficient amount of acceleration would be lower for a vehicle with a larger GCW as compared to a vehicle with a smaller GCW. This process is repeated until a satisfactory maximum starting gear is determined by the system 10. Thus, the new lower gear may be the next lower starting gear or may be any lower starting gear.

If the GCW is not yet known, then the maximum start gear will be limited to that for a fully laden vehicle, for example, 80,000 lbs. in Step 3.6. Also, if the system 10 determines in Step 3.3 that sufficient acceleration for the corresponding torque at the flywheel is not achieved upon start in this gear, then system 10 will force a downshift making that new lower gear the maximum starting gear in Step 3.4 until the vehicle achieves a threshold speed.

As described above, even if the driver is starting in the right gear, excessive power can be transferred through the clutch by depressing the accelerator and/or engaging the clutch 16 too aggressively. To protect against too much power transferred through the clutch 16, the power transferred through the clutch 16 is determined in Step 3.7. The power transferred through the clutch 16 can be determined by the transmission input speed, the engine speed and the torque at the flywheel. A method of determining torque at the flywheel is disclosed in U.S. Pat. No. 5,509,867, the disclosure of which is herein incorporated by reference. The engine torque can be limited (via J1939 commands or similar data bus) to a preset value that will result in the power transferred through the clutch 16 to remain below a preset limit. In addition, the engine speed is limited (via J1939 commands or similar data bus) to a preset value of about 200–300 RPM above idle speed in Step 3.8. The control then exits in Step 3.9.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of controlling a vehicular automated transmission system for a vehicle comprising a fuel-controlled engine, an engine fuel control device, a multiple-speed transmission coupled to the engine by a master friction clutch, and a controller for receiving input signals including one or more of signals indicative of engine speed, transmission input speed, transmission output speed, operator throttle setting, clutch engagement and gear ratio, and to process said input signals in accordance with logic rules to issue command output signals to transmission system actuators including said fuel control device, said method comprising the steps of:

(a) determining a maximum starting gear of said system when a weight of the vehicle is known by said system; and (b) limiting the maximum starting gear of said system to a fully laden vehicle when the weight of the vehicle is not known by said system.

2. The method of claim 1 further including the step of determining an allowed start gear ratio when insufficient vehicle acceleration is being detected by said system.

3. The method of claim 2 further including the step of forcing a downshift of said transmission until said system detects sufficient vehicle acceleration.

4. The method of claim 1 further including the step of determining the power transmitted through said clutch.

5. The method of claim 4, wherein the power transmitted through said clutch is determined by the transmission input speed, the engine speed and the torque at a flywheel.

6. The method of claim 4 further including the step of limiting one of engine torque and engine speed when excessive power through said clutch is detected by said system.

7. The method of claim 6, wherein excessive power through said clutch is determined by the transmission input speed, the engine speed and the torque at a flywheel.

8. A control system for controlling a vehicular automated mechanical transmission system, comprising:

an engine, an engine fuel control device, a multiple-speed transmission coupled to the engine by a master friction clutch, and a controller for receiving input signals including one or more of signals indicative of engine speed, transmission input speed, transmission output speed, operator throttle setting, clutch engagement and gear ratio, and a microprocessor to process said input signals in accordance with logic rules to issue command output signals to transmission system actuators;

a first input signal corresponding to a predetermined weight of the vehicle;

a second input signal corresponding to vehicle acceleration, wherein the microprocessor issues a first output signal corresponding to a starting gear ratio to said transmission when the predetermined weight of the vehicle is known by said system; and wherein the microprocessor issues a second output signal corresponding to a maximum starting gear ratio of a fully laden vehicle to said transmission when the predetermined weight of the vehicle is not known by said system.

9. The system of claim 8, wherein the microprocessor determines an allowed start gear ratio of said system when insufficient vehicle acceleration is being detected by said system.

10. The system of claim 9, wherein the microprocessor issues a signal to force a downshift of said transmission until said system detects sufficient vehicle acceleration.

11. The system of claim 8, wherein the microprocessor determines a power transmitted through said clutch based on the transmission input speed, the engine speed and the torque at a flywheel.

12. The system of claim 11, wherein the microprocessor limits one of engine torque and engine speed to a predetermined value when excessive power through said clutch is detected by said system.

* * * * *